US007000073B2

(12) United States Patent
Chen et al.

(10) Patent No.: US 7,000,073 B2
(45) Date of Patent: Feb. 14, 2006

(54) BUFFER CONTROLLER AND MANAGEMENT METHOD THEREOF

(75) Inventors: Murphy Chen, Hsin Tien (TW); Perlman Hu, Hsin Tien (TW)

(73) Assignee: Via Technologies, Inc., Hsin Tien (TW)

( * ) Notice: Subject to any disclaimer, the term of this patent is extended or adjusted under 35 U.S.C. 154(b) by 298 days.

(21) Appl. No.: 10/400,523

(22) Filed: Mar. 28, 2003

(65) Prior Publication Data

US 2003/0191895 A1 Oct. 9, 2003

(30) Foreign Application Priority Data

Apr. 3, 2002 (TW) .............................. 91106779 A

(51) Int. Cl.
*G06F 12/02* (2006.01)

(52) U.S. Cl. ....................... 711/118; 711/119; 711/120; 711/121; 711/122; 710/52; 710/53; 710/56; 710/57

(58) Field of Classification Search ................ 709/213; 710/52–57; 711/105, 104, 118–122
See application file for complete search history.

(56) References Cited

U.S. PATENT DOCUMENTS

| | | | | |
|---|---|---|---|---|
| 5,535,197 | A * | 7/1996 | Cotton | 370/395.72 |
| 5,633,865 | A * | 5/1997 | Short | 370/412 |
| 5,812,775 | A * | 9/1998 | Van Seters et al. | 709/213 |
| 6,108,692 | A * | 8/2000 | Van Seters et al. | 709/213 |
| 6,119,254 | A * | 9/2000 | Assouad et al. | 714/724 |
| 6,826,354 | B2 * | 11/2004 | Tezuka | 382/218 |

* cited by examiner

*Primary Examiner*—T Nguyen
(74) *Attorney, Agent, or Firm*—Arent Fox PLLC

(57) ABSTRACT

The invention provides a new linked structure for a buffer controller and management method thereof. The allocation and release actions of buffer memory can be more effectively processed when the buffer controller processes data packets. The linked structure enables the link node of the first buffer register to point to the last buffer register. The link node of the last buffer register points to the second buffer register. Each of the link nodes of the rest buffers points to the next buffer register in order until the last buffer register. This structure can effectively release the buffer registers in the used linked list to a free list.

11 Claims, 5 Drawing Sheets

BUFFER CONTROLLER AND MANAGEMENT METHOD THEREOF

BACKGROUND OF THE INVENTION

1. Field of Invention

The invention relates to a buffer controller and management method thereof. More explicitly, the invention provides a buffer controller that utilizes a new linked structure to manage the allocation and release of a buffer memory and the corresponding buffer management method.

2. Related Art

With reference to FIG. 1, normally a buffer memory 30 is installed between a controller and other devices for temporarily storing and managing data. The buffer memory 30 can be an SDRAM (Synchronous Dynamical Random Access Memory), an SRAM (Static Random Access Memory), or a DRAM (Dynamical Random Access Memory). The controller 10 and the buffer memory 30 are further connected with a buffer controller 20 in between. The buffer controller 20 is used to manage data access between the controller 10 and the buffer memory 30 to increase the data processing efficiency.

FIG. 2 is a schematic view of conventional buffer management using the linked list method. When the procedure starts, a pointer 40 points to a first unused buffer register 30.0001 in the buffer memory 30. The unused buffer registers 30.0001 to 30.2048 form a linked structure. That is, the buffer register 30.0001 uses its link node to point to 30.0002, the buffer register 30.0002 in turn uses its link node to point to 30.0003, and so on, until the buffer register 30.2408. The link node of the last buffer 30.2048 points to null, meaning the end of the list. With reference to FIG. 3, the buffer controller 20 has a pointer 40 for recording the address of the first unused buffer register 30.0001. When the procedure starts, the pointer 40 points to the buffer register 30.0001. When the buffers 30.0001 to 30.0003 are continuously stored with data, the pointer 40 has to point to 30.0004 through the link node of the buffer register 30.0003. After the buffer registers 30.0001 to 30.0003 are done in use, the buffer controller 20 releases the link nodes of the buffers 30.0001 to 30.0003 to the beginning of the list, one by one. That is, the link node of the buffer 30.0003 has to be changed from pointing to the unused buffer register 30.0004 to pointing back to the buffer register 30.0003. The buffer registers 30.0002 and 30.0001 are also released in order. From the above description, such a simple releasing process involves complicated hardware operations. The first address, the second address and the segment counter of the released buffer register have to be reported to the buffer controller 20 for the pointer 40 to have correct the pointing control. However, such information occupies some memory space. If a large amount of data is being transmitted, the SRAM load will increase tremendously. Furthermore, the buffer controller 20 is installed with only one pointer 40. Requiring the configuring and freeing actions to always start from the beginning of the list may result in overusing the pointer 40, greatly affecting the management efficiency of the buffer controller 20 over the buffer registers.

For a switch controller as an example, the buffer registers usually allocated as a buffer memory. The sizes of buffer registers can be defined according to different applications. The normal capacity of the buffer register is 128 bytes. For a packet on the Ethernet, the largest length of the packet allowed for transmission is 1522 bytes and the minimal length is 64 bytes. Therefore, one segment may need up to 12 buffer registers for the storage of a packet during transmissions and receptions. It further uses the high-speed transmission property of the SRAM to be the communication bridge between the CPU (Central Processing Unit) and the DRAM for speeding up the transmissions. However, if the switch controller continuously receives largest Ethernet packets, cache memory is needed to effectively ease the load of the linked list. The allowed cache memory is nevertheless limited. Therefore, the load on the linked list in this case is still too much and the buffer releasing process is still very slow in speed. It is thus necessary to find another more efficient management method that satisfies the growing demand for a fast network.

SUMMARY OF THE INVENTION

An object of the present invention is to provide a buffer controller, which uses a new link structure to manage the allocation and release of buffer registers, thereby improving the buffer memory access efficiency and simplifying the hardware design.

In view of the fact that the conventional buffer management technique involves complicated hardware operations when releasing the used segment according to the conventional linked list, the execution efficiency is low and the SDRAM load is too heavy. In one embodiment of the present invention, a buffer controller comprises a head pointer and a tail pointer. The head pointer and the tail pointer point to the addresses of the first buffer register and the last buffer register in an unused free list, respectively. The buffer controller further contains a cache memory for storing addresses of a plurality of buffer registers. When the buffer controller is requested to allocate the segment, a plurality of buffer registers, the addresses of which are stored in the cache memory, are allocated, then the buffer controller extracts the buffer registers from the unused list, one by one, and forms the segment with a list structure. Afterwards, the head pointer points to the first buffer register of the segment. When releasing the segment, the buffer controller preferably obtains the addresses of the first buffer register, the second buffer register and the last buffer register of the segment, and the segment length. First, the address of the first buffer register is stored in the cache memory, then the buffer register pointed by the tail pointer points to the second buffer register. Finally, the tail pointer directly points to the last buffer register, i.e. the address of the last buffer register is stored in the tail pointer, so that the segment with the list structure is stitched to the end of the unused list.

In another embodiment of the present invention, a new linked structure is applied to the allocation action of the buffer controller, so that the released segment can immediately obtain the information of the second address without the report to the buffer controller. The linked structure has a first buffer register to directly point to the last buffer register, then the last buffer register points to the second buffer register. The linked structure from the second buffer register to the last buffer register is a list structure. Therefore, the release of buffer memory can immediately obtain the information about the second address from the link node of the last buffer register. The second address is stored in the link node of the buffer register pointed by the tail pointer, then the last address is stored in the tail pointer. Therefore, the segment with the linked structure can be directly linked to the end of an unused list without releasing one by one. This method does not only save memory space to store the second address, it also retain the original hardware design so that the buffer memory can be used efficiently.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
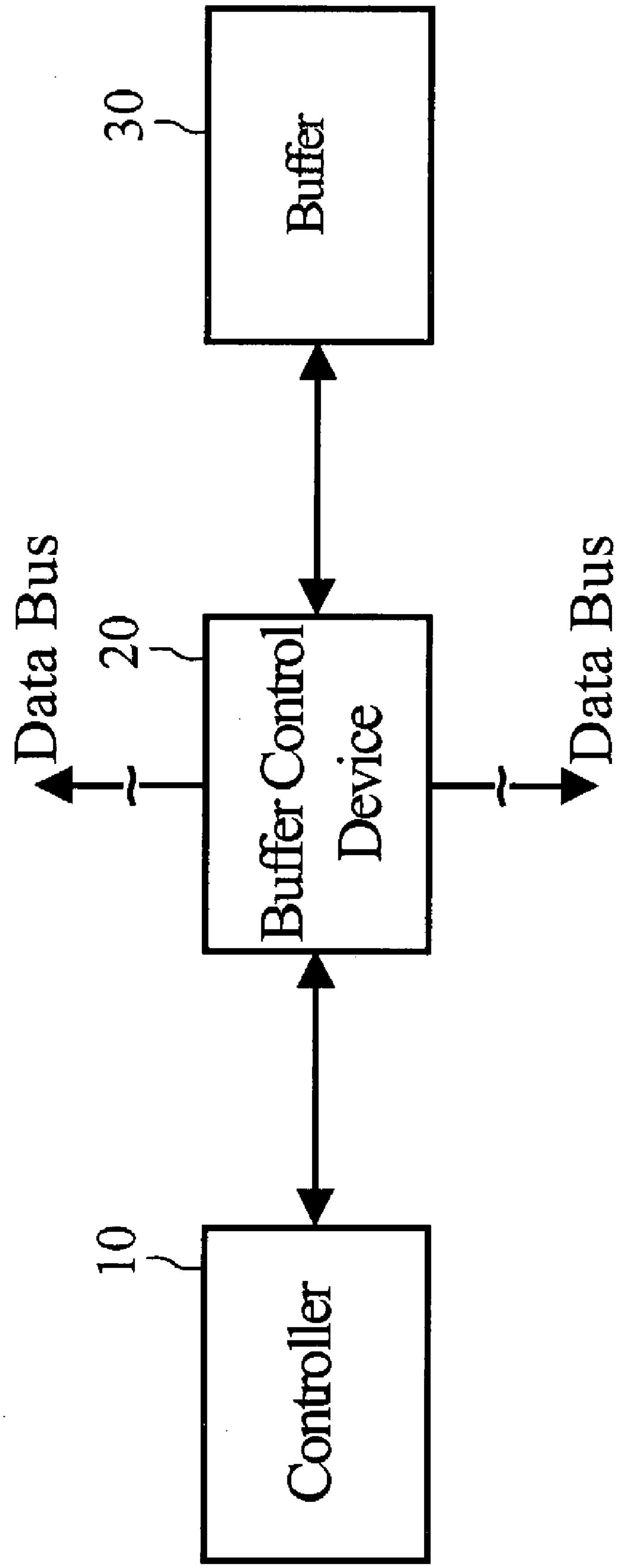
FIG. 1 is a block diagram showing the connection between a buffer and a controller in the prior.
Figure 2:
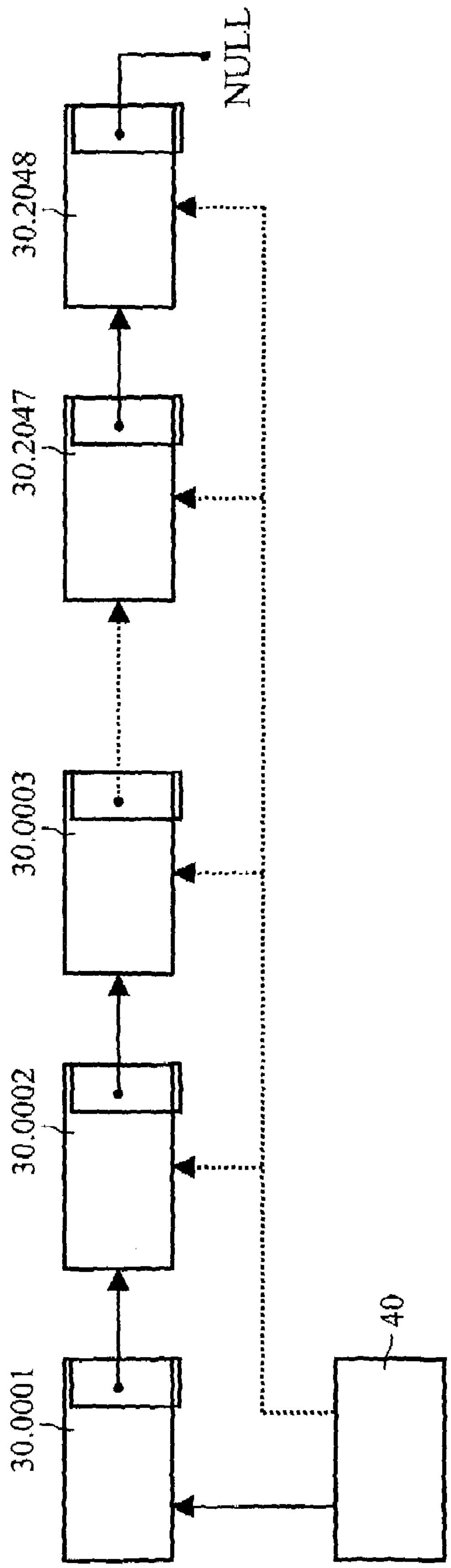
FIG. 2 is a schematic diagram of conventional buffer management using a linked list.
Figure 3:
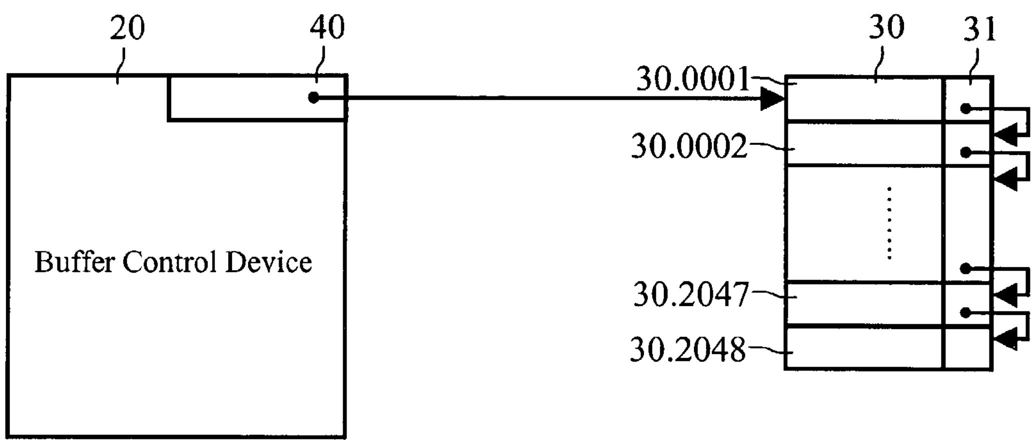
FIG. 3 is a schematic diagram of the conventional buffer controller hardware in accord with the management method of FIG. 2.
Figure 4:
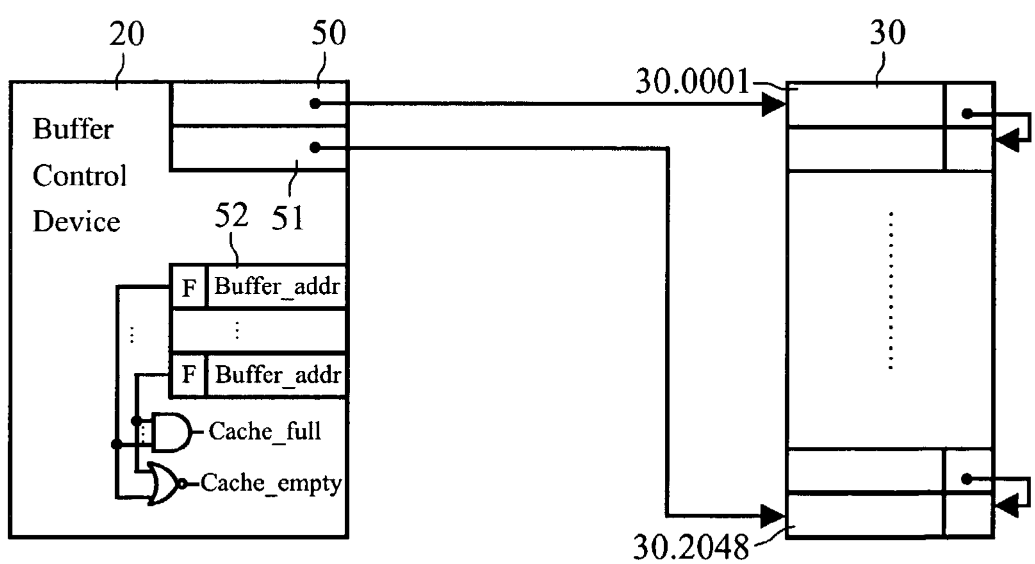
FIG. 4 is a schematic diagram of a buffer controller according to the present invention.

With reference to FIG. 4, the buffer memory 30 contains a free list comprising a plurality of buffer registers in series. Each buffer register has a corresponding link node 31, which has a field as the pointer for linking.

In the first embodiment of the invention, a switch controller uses a buffer controller. The buffer controller controls a buffer memory to temporarily store packets of transmitting data. The buffer controller 20 has a head pointer 50 and a tail pointer 51. After initialization, the pointers 50, 51 point to the first address 30.0001 and the last address 30.2048 of a free list, respectively. Preferably, the buffer controller 20 contains a cache memory 52 for pointing to available buffer registers, so cache memory 52 stores the addresses of available buffer registers. In the free list, the buffer register 30.0001 uses its link node to point to the next buffer register 30.0002; the buffer register 30.0002 uses its link node to point to the next buffer register 30.0003. Such links continue until the last buffer register 30.2048. The link node of the last buffer register 30.2048 points to null, indicating the end of the free list.

In a second embodiment of the invention, suppose the cache memory 52 embedded in the buffer controller of the switch controller has three cache units. These cache units can be embedded SRAM units, flip-flops, or registers. When the switch controller is initialized, the addresses 30.0001, 30.0002, 30.0003 are stored in the cache memory 52 and the head pointer 50 points to the address 30.0004. When allocating a memory space, the addresses of available buffer registers are assigned for the allocation from the cache memory 52 with a priority. As previously planned, each buffer register thus obtained has a size of 128 bytes. If the incoming packets are small ones (the smallest has 64 bytes), the system only needs to ask the cache memory 52 for allocating one buffer register. After using the buffer register, the address of the buffer register released will be stored in the cache memory 52. In this case, the head pointer 50 is rarely used. This means that the number of SRAM access actions is effectively reduced.

It should noted that in practice there is no need to really store the physical address of each buffer register because the size of all buffer registers is designed to be 128 bytes. The thing that needs to be recorded is the corresponding buffer ID, Buffer_ID. By a physical address converter module, Buffer ID can be conveniently converted into the corresponding physical address. This can greatly speed up the data access and reduce the number of gate counts in the hardware design.

It is also noted that the buffer controller according to the present invention can be applied to all kinds of buffer management situations. In this embodiment, the switch controller is described for illustration.

In the second embodiment, when the switch controller is initialized and is asked to allocate a segment (the length of the requested segment is 10), the addresses 30.0001, 30.0002, and 30.0003 of buffer registers are first assigned and appropriately linked to form a linked structure. Afterwards, the buffer register 30.0004 pointed by the head pointer 50 is linked to the buffer register 30.0003, and renews the head pointer 50 to point to the address 30.0005 according to the link node of the buffer address 30.0004. Then the buffer register 30.0005 pointed by the head pointer 50 is allocated, and the head pointer 50 is updated to point to the address 30.0006. After such allocation one after one, the head pointer 50 finally points to 30.0011. In particular, the segment has a linked structure. The buffers used by the same packet are also appropriately linked together so that all the buffer registers can be released altogether after use (after the packet is successfully sent out). In the embodiment, if the segment 30.0001 to 30.0010 is done in use, then the first address 30.0001, the second address 30.0002, the last address 30.0010 and the length of the segment are reported to the buffer controller. The buffer controller 20 stores the first address 30.0001 in the cache memory 53 and links the segment 30.0002 to 30.0010 to the end of the free list. That is, the second address 30.0002 is stored to the link note of the buffer register pointed by the tail pointer 51. Then, the last address 30.0010 is directly stored in the tail pointer 51. Therefore, the allocation and release actions of the buffer controller in the switch controller can be processed at the same time from the beginning and the end. This can effectively enhance the management efficiency of the buffer controller 20 over the buffer registers.

Please still referring to FIG. 4. Since the number of cache units in the cache memory 52 is limited, it is preferably to have each cache unit contain a Full bit to record the information about whether the corresponding cache unit is pointing to an available buffer register. This can be done by making all Full bits go through an AND gate to generate a Cache_full signal and go through an XOR gate to generate a Cache_empty signal. Cache_full indicates whether the cache memory 52 is stored full, while Cache_empty indicates whether the available addresses in the cache memory 52 are allocated over. Therefore, when the buffer controller 20 allocates a segment, Cache_empty signal is checked to determine if there are any available addresses. If there are some available addresses, the buffer addresses in the cache memory 52 are allocated with a priority. If there is none in the cache memory 52, then the head pointer 50 keeps allocating the buffer registers. During the buffer allocation process, the buffer registers are linked to form a segment with a linked list structure.

When the used segment is released, the buffer controller 20 checks the Cache_full signal to determine whether the cache memory 52 is stored full. If there is still extra space, then the buffer registers of the segment are first released back to the cache memory 52. The way of releasing buffers can be varied according to the used linked list structure and be linked to the end of the unused linked list. For example, the first address of the used linked list to be released is stored in the link node of the buffer register pointed by the tail pointer 51. The last address is directly stored in the tail pointer 51.

In the embodiment, the first buffer register used for storing the packet preferably obtains the reported information. It also contains other important information, including the number of total buffer register counts, port masks, priority, etc. Therefore, when the amount of returned information increases, the capacity of the first buffer may not be enough in use or the hardware design has to be changed. Thus, the invention further discloses a new link structure for the buffer controller.

According to the second embodiment of the invention, the cache memory 52 embedded in the switch controller has three cache units. Once initialized, the addresses 30.0001, 30.0002, and 30.0003 (or the corresponding Buffer_ID) are filled into the cache memory 52. The buffer controller 20 installed with a head pointer 50 and a tail pointer 51, pointing to the first address 30.0004 and the last address 30.2048 of the unused linked list, respectively. The buffer management method is described in the following paragraph.

Figure 6:
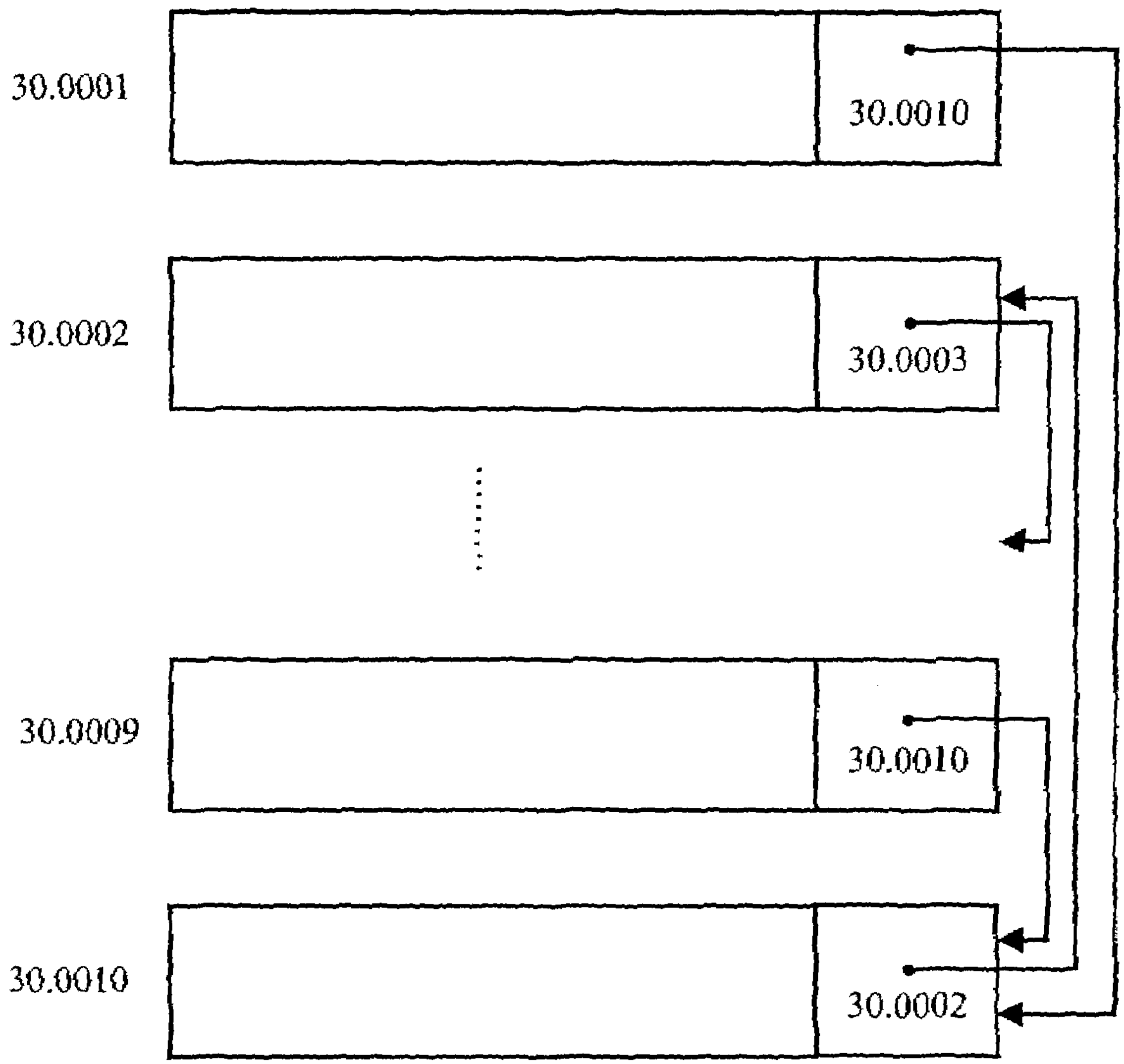
FIG. 6 is a schematic diagram of the linked structure according to the present invention.

After the switch controller is initialized, if a segment with a length of 10 bits is allocated, it is preferably to first issue the addresses 30.0001, 30.0002, and 30.0003 from the cache memory 52 and to appropriately link them together. To form the above-mentioned special list, the switch controller temporarily keeps the first two issued addresses 30.0001 and 30.0002. The head pointer 50 then points to the buffer register 30.0004, which is linked to the buffer address 30.0003. In accord with the corresponding link node of the buffer address 30.0004, the head pointer 50 is renewed to store the address 30.0005. After the head pointer 50 obtains the buffer register 30.0005, it is further renewed to store the address 30.0006. This process goes on until the last buffer address 30.0010 is allocated. The second issued address 30.0002 is filled into the link node of the buffer register last allocated. Finally, the last address 30.0010 is filled into the corresponding link node of the first buffer register with address 30.0001. Consequently, as shown in FIG. 6, the first buffer register is linked to point to the last buffer register. The last buffer register is linked to point to the second buffer register. The rest issued buffer registers are linked to point to the next buffer register is order. The issued segment thus has the desired linked structure according to the invention, so that the segment can be more effectively released after use (after the packet is successfully sent out).

Figure 5:
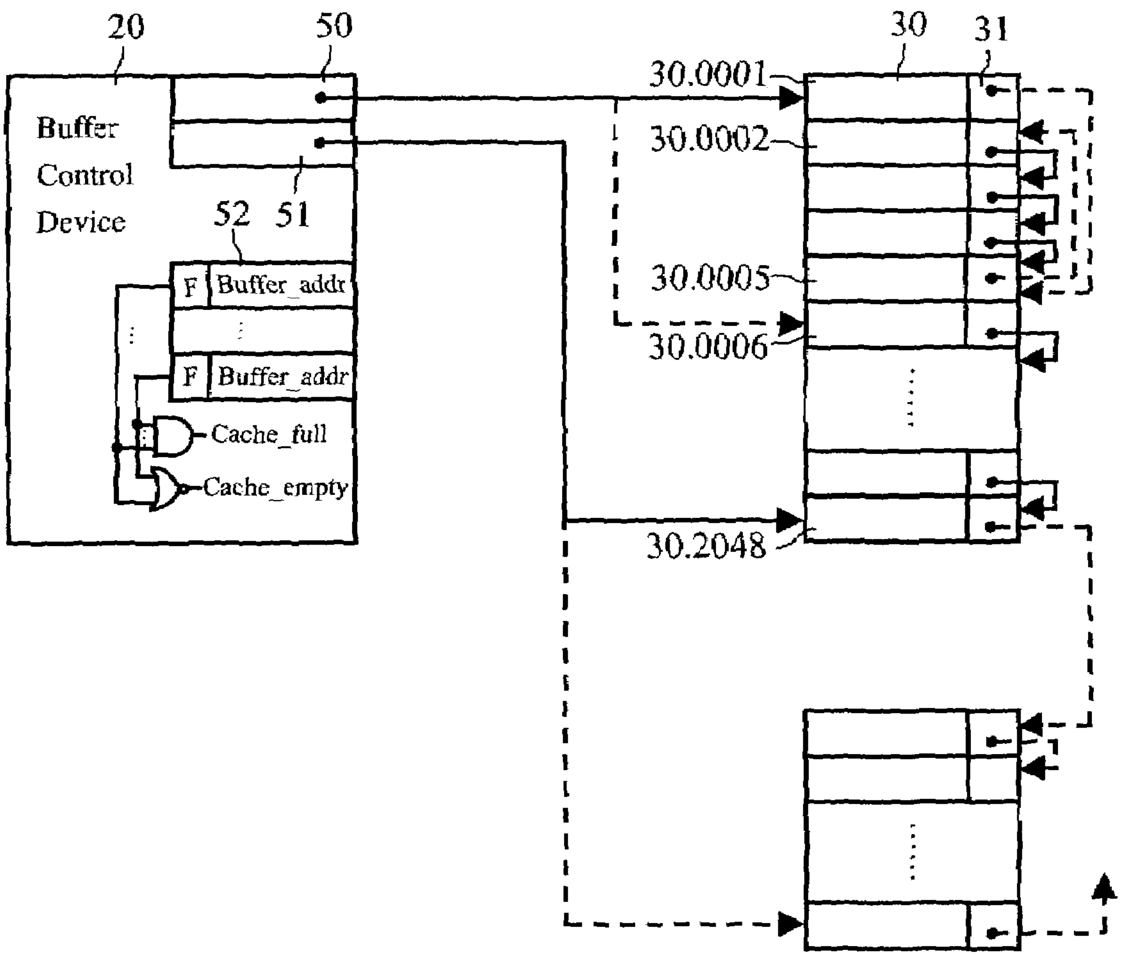
FIG. 5 is a schematic diagram of releasing a used list by the buffer controller according to the present invention.

When releasing one such a segment with the disclosed special linked list, the buffer controller 20 preferably obtains such information as the first address of the first buffer register, the second address of the second buffer register, the last address of the last buffer register, and the segment length. With reference to FIG. 5, the buffer controller 20 first checks the Cache-full signal. As long as there is an available space, the first address of the first buffer register is directly stored in the cache memory 52. Then the second address is stored in the link node of buffer register pointed by the tail pointer 51. The last address is stored in the tail pointer 51. Consequently, the used buffer registers can be rapidly released back to the free list on the right-hand side altogether, without releasing one by one. Of course, if the cache memory is stored full when checking the Cache-Full signal, it is necessary to do one more linking in order to link the first buffer back to the free list on the right-hand side. That is, the second address is filled into the link node corresponding to the first buffer register. Afterwards, the rest buffers in the list are linked back to the free list in a similar fashion. In particular, this method does not care the content of the link node of the last buffer register because its link node will be covered by the content during the next use of the last buffer register. The buffer controller 20 can be equipped with a counter, which counts the number of available buffers register. Therefore, when the packet flow is too large and the free list is used up, the temporarily stored data will not be covered by others.

It should be mentioned that the above-mentioned release action can have different variations. For example, one can only report the first address of the first buffer register, the last address of the last buffer register, and the segment length to the buffer controller 20 without reporting the second address. The first address is stored in the cache memory 52. The second address is obtained from the link node of the last buffer register and stored in the link node of the buffer register pointed by the tail pointer 51. The last address is finally stored in the tail pointer 51. In particular, this scheme does not care the content of the link node of the last buffer register. Thus, the link node content of the last buffer register can be covered in the next use.

FIG. 5 shows that the head pointer 50 directly allocates five buffers. Suppose the head pointer 50 points to the buffer register 30.0001. If the buffer controller 20 checks the Cache_empty signal and finds that the cache memory 52 is allocated over, then the head pointer 50 releases the first address 30.0001. Then buffer registers of the list are extracted in order from the addresses pointed by the head pointer 50. The head pointer 50 finally points to the address 30.0006. Analogously, the stitching action of the buffer controller 20 is to directly point from the link node of the first buffer register to the last address 30.0005. The link node of the last buffer register points to the second address 30.0002.

If the buffer controller 20 checks that the Cache_full signal and finds that the cache memory is stored full when releasing memory space, then the release action according to the buffer controller management method includes the steps of: storing the first address into the link node of the buffer register pointed by the tail pointer 51; storing the second address into the link node of the first buffer register; and storing the last address to the tail pointer 51. The released segment is thus linked to the end of the free list with a normal list structure.

This embodiment of the invention does not need to store the second address, while keeping the original hardware structure so that the buffer memory can be more effectively utilized.

In yet another embodiment of the invention, the segment with the disclosed linked structure does not need to report the second address and the last address during the release action. Only the first address of the used segment is reported. The buffer controller 20 can obtain in order the last address and the second address according to the first buffer register with the first address. The release action of the buffer controller 20 includes the steps of: temporarily storing the last address obtained from the link node of the first buffer register with the first address; storing the first address into the cache memory; obtaining the second address from the link node of the last buffer register with the last address and storing it into the link node of the buffer register pointed by the tail pointer 51; and finally storing the last address in the tail pointer 51.

With reference to FIG. 6, the linked structure is a cyclically linked list pointed by the link node of the first buffer register. The cyclically linked list starts from the second buffer register, with the link nodes of each buffer register pointing to the next one until the link node of the last buffer register. The link node of the last buffer register points back to the second buffer register. The link node of the first buffer register points to the last buffer register. The disclosed linked structure is applied to the above-mentioned packet switch controller to store packet data, so that the buffer controller 20 can obtain the address of the second buffer register from the last buffer register while storing the first address of the segment in the cache memory. The buffer registers of the list are linked back to the end of the free list.

It is noted that the above-mentioned embodiment is installed with the head and tail pointers. The hardware operations can avoid situations that the allocation and release actions may use the same pointer. Using the linked structure, the first and the last addresses can be efficiently obtained. Therefore, if the hardware design has only one head pointer, the released linked structure can be linked back to the front of the free list. However, the efficiency of this prior art is not so good.

For example, the used linked structure of the invention has the link node of the first buffer register 30.0001 directly point to the last buffer register 30.0010. The link node of the last buffer register 30.0010 then points to the second buffer register 30.0002. Afterwards, the rest buffer registers points in order to the next one until the last buffer register. When the buffer controller releases the segment with the linked structure, it can immediately obtain the second address 30.0002 from the last buffer register 30.0010. Then the second buffer register to the last buffer register are linked back to the free list altogether without releasing them one by one.

Effects of the Invention

The packet switch in the prior art requires too much memory space and a longer processing time. The invention provides a new linked structure for a buffer controller. The disclosed buffer controller can more efficiently process memory allocation and release of packets. Memory space is economically used so that buffer memory can be used and managed with high efficiency.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A buffer controller for managing a buffer memory having a free list, said free list comprising a plurality of buffer registers, said buffer controller comprising:

a head pointer, pointing to a first buffer register in the free list;

a tail pointer, pointing to a last buffer register in the free list; and a cache memory, storing the addresses of a plurality of unused buffer registers;

wherein the unused buffer registers stored in the cache memory, are allocated a first priority for use when the buffer controller is asked to allocate a segment.

2. The buffer controller of claim 1, wherein the number of the unused buffer registers stored in the cache memory, is smaller than the size of the segment, the buffer controller extracts the buffer registers from the free list, one by one, by means of the head pointer.

3. The buffer controller of claim 1, wherein when the segment is returned and the used buffer registers stored to the cache memory having a priority are released.

4. The buffer controller of claim 3, wherein the buffer controller directly links a used linked list in the segment to the end of the free list.

5. The buffer controller of claim 1, wherein when the used segment is returned and the used buffer registers are released, the cache memory points to the first buffer register of the segment; the buffer register pointed by the tail pointer points to the second buffer register of the segment; and the tail pointer points to the last buffer register of the segment, so that the segment is linked to the end of the free list.

6. The buffer controller of claim 1, wherein each of the buffer registers has a link node for pointing to the next buffer register.

7. The buffer controller of claim 4, wherein when the used segment is returned, the buffer controller obtains the addresses of the first buffer register, the second buffer, and the last buffer register.

8. The buffer controller of claim 3, wherein the buffer controller has a first signal for indicating whether the cache memory is stored full and a second signal for indicating whether the cache memory is stored full and a second signal for indicating whether the addresses of all buffer registers in the cache memory are allocated over.

9. The buffer controller of claim 8, wherein when allocating the segment, the buffer controller checks the second signal to determine whether the addresses of a plurality of buffer registers for use are allocated in the cache memory.

10. The buffer controller of claim 8, wherein when releasing the segment, the buffer controller checks the first signal to determine whether the used buffer registers are released back to the cache memory having a priority.

11. The buffer controller of claim 1, wherein the allocated segment is used to temporarily store a packet.

* * * * *